US012664651B2

(12) United States Patent
Tian et al.

(10) Patent No.: US 12,664,651 B2
(45) Date of Patent: Jun. 23, 2026

(54) METHOD OF SEGMENTING COMPUTED TOMOGRAPHY IMAGES OF TEETH

(71) Applicant: WUXI EA MEDICAL INSTRUMENTS TECHNOLOGIES LIMITED, Jiangsu (CN)

(72) Inventors: Yuan Tian, Shanghai (CN); Yang Feng, Shanghai (CN); Ge Wang, Shanghai (CN)

(73) Assignee: Wuxi EA Medical Instruments Technologies Limited, Jiangsu (CN)

( * ) Notice: Subject to any disclaimer, the term of this patent is extended or adjusted under 35 U.S.C. 154(b) by 267 days.

(21) Appl. No.: 18/546,872

(22) PCT Filed: Feb. 8, 2022

(86) PCT No.: PCT/CN2022/075513
§ 371 (c)(1),
(2) Date: Aug. 17, 2023

(87) PCT Pub. No.: WO2022/174747
PCT Pub. Date: Aug. 25, 2022

(65) Prior Publication Data
US 2024/0127445 A1 Apr. 18, 2024

(30) Foreign Application Priority Data
Feb. 18, 2021 (CN) .......................... 202110190754.8

(51) Int. Cl.
*G06T 7/00* (2017.01)
*G06T 7/11* (2017.01)
(Continued)

(52) U.S. Cl.
CPC .............. *G06T 7/0012* (2013.01); *G06T 7/11* (2017.01); *G06T 7/12* (2017.01); *G06T 7/136* (2017.01);
(Continued)

(58) Field of Classification Search
CPC ..................... G06T 7/0012; G06T 7/11; G06T 2207/10081; G06T 2207/20081;
(Continued)

(56) References Cited

U.S. PATENT DOCUMENTS

2020/0175678 A1 6/2020 Abraham et al.
2020/0320685 A1* 10/2020 Anssari Moin ...... G06V 20/653

FOREIGN PATENT DOCUMENTS

CN 106806030 A 6/2017
CN 108932716 A 12/2018
EP 3673864 A1 7/2020

OTHER PUBLICATIONS

Lee et al., , "Application of a fully deep convolutional neural network to the automation of tooth segmentation on panoramic radiographs", Oral and Maxillofacial Radiology, pub. 2020. (Year: 2020).*

(Continued)

Primary Examiner — Mekonen T Bekele
(74) Attorney, Agent, or Firm — Polsinelli

(57) ABSTRACT

A computer-implemented method of segmenting computed tomography images of teeth comprising obtaining a first 3D digital model representing crowns of erupted teeth of a first jaw and a 2D CT image sequence of the first jaw; using a local image classification model to select from the sequence, for each erupted tooth, a 2D CT image from which segmentation of the erupted tooth starts, the local image classification model being a trained deep neural network for classifying a local 2D CT image as crown or root; obtaining position and coverage information of each erupted tooth based on the first 3D digital model; and using the position and coverage information and a local image segmentation model to segment local images of the erupted tooth starting from the selected 2D CT image towards the crown and the (Continued)

100 a first 3D digital model representing crowns of a first jaw and a 2D CT image sequence of the first jaw are obtained — 101 masks of crowns are extracted based on the 2D CT image sequence — 103 the first 3D digital model and the crown mask sequences are projected on a plane and the projections are registered — 105 positions and coverages of erupted teeth are determined based on the registration — 107 re-segmentation is performed based on the position and coverage information of the erupted teeth to obtain mask sequences of the erupted teeth — 109 mask sequences of impacted teeth are obtained by segmentation based on a brightness curve of a global mask sequence — 111 root of the erupted tooth to obtain a binary mask image sequence of the tooth.

16 Claims, 3 Drawing Sheets

(51) Int. Cl.
*G06T 7/12* (2017.01)
*G06T 7/136* (2017.01)

(52) U.S. Cl.
CPC .............. *G06T 2207/10081* (2013.01); *G06T 2207/20081* (2013.01); *G06T 2207/20084* (2013.01); *G06T 2207/30036* (2013.01)

(58) Field of Classification Search
CPC . G06T 2207/20084; G06T 2207/30036; G06T 2207/10028; G06T 7/10; G06V 20/64; G06V 2201/03; G06V 10/34; G06V 10/26; G06V 10/82; G06N 3/0464; G06N 3/08; G06F 18/241
See application file for complete search history.

(56) References Cited

OTHER PUBLICATIONS

Tohnak et al ., "Synthesizing panoramic radiographs by unwrapping dental CT data", Proceedings of the 28th IEEE, Aug. 30-Sep. 3, 2006. (Year: 2006).*
International Search Report, PCT/CN2022/075513, dated Apr. 15, 2022, 2 pgs.

* cited by examiner

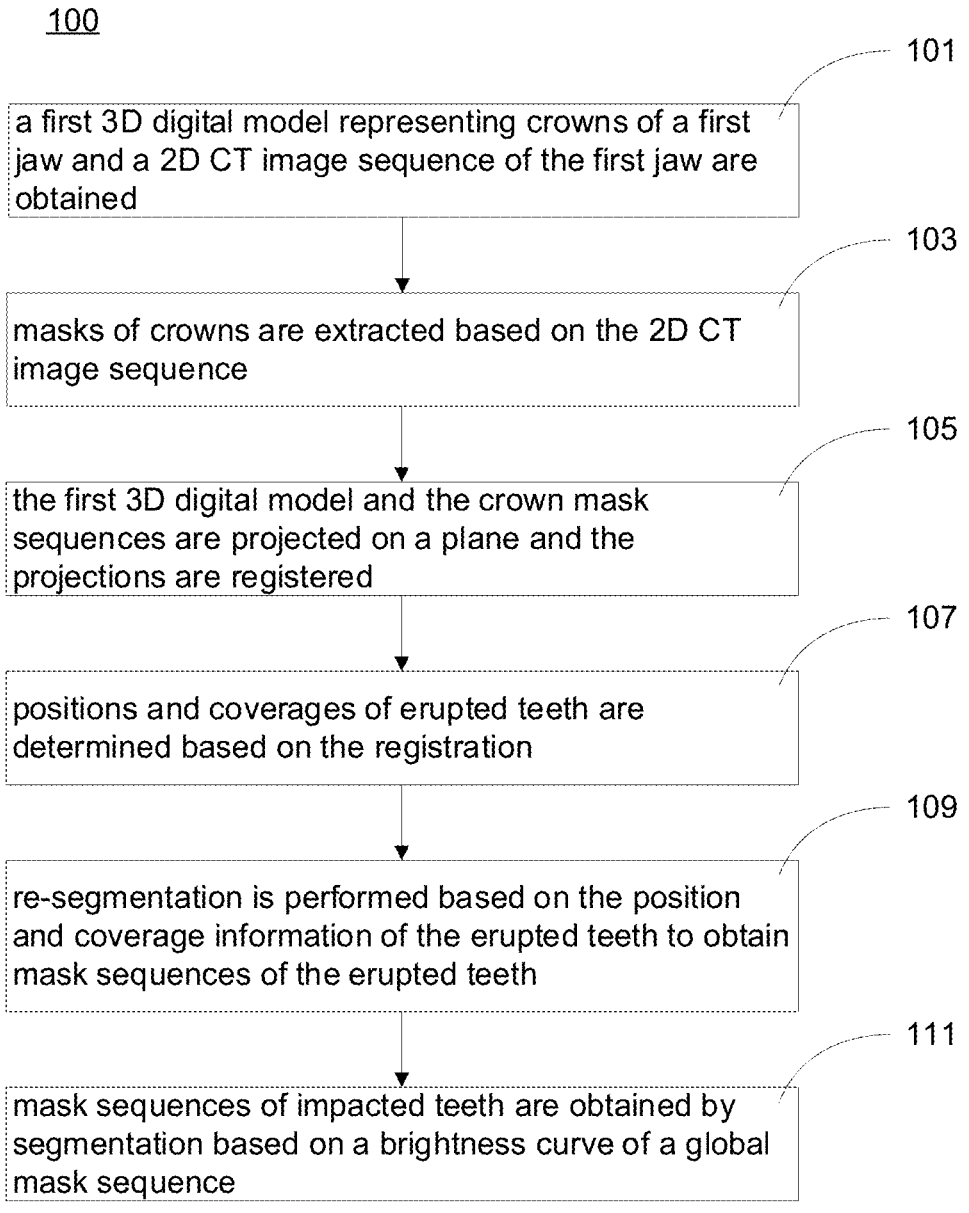

100 a first 3D digital model representing crowns of a first jaw and a 2D CT image sequence of the first jaw are obtained — 101 masks of crowns are extracted based on the 2D CT image sequence — 103 the first 3D digital model and the crown mask sequences are projected on a plane and the projections are registered — 105 positions and coverages of erupted teeth are determined based on the registration — 107 re-segmentation is performed based on the position and coverage information of the erupted teeth to obtain mask sequences of the erupted teeth — 109 mask sequences of impacted teeth are obtained by segmentation based on a brightness curve of a global mask sequence — 111

FIG. 1

METHOD OF SEGMENTING COMPUTED TOMOGRAPHY IMAGES OF TEETH

FIELD OF THE APPLICATION

The present application generally relates to a method of segmenting computed tomography images of teeth.

BACKGROUND

With development of computer sciences, dental professionals reply more and more on computer technologies to improve the efficiency of dental diagnosis and treatment. A 3D digital model of teeth is often used in computer-aided dental diagnosis and treatment.

At present, a 3D digital model of crowns of teeth with a high precision can be obtained by intraoral scan or by scanning an impression or a physical model of the teeth, but information of roots of the teeth cannot be obtained by this method.

As for some diagnosis and treatment (e.g., an orthodontic treatment) that require information of roots of teeth, a Computed Tomography (hereinafter referred to as CT) technology may be used to obtain a 2D CT image sequence of whole teeth (including crowns and roots), and generate a 3D digital model of the whole teeth based on the 2D CT image sequence. Since the 2D CT images obtained using the CT technology includes the teeth as well as the jawbones, the images need to be segmented to remove jawbones and keep the teeth before the 2D CT image sequence is used to create the 3D digital model of the whole teeth.

In view of the above, it is necessary to provide a method of segmenting computed tomography images of teeth.

SUMMARY

In one aspect, the present application provides a computer-implemented method of segmenting computed tomography images of teeth, the method comprises: obtaining a first 3D digital model representing crowns of erupted teeth of a first jaw and a 2D CT image sequence of the first jaw; using a local image classification model to select, for each erupted tooth, a 2D CT image from which segmentation of the erupted tooth starts, from the 2D CT image sequence of the first jaw, wherein the local image classification model is a trained deep neural network and is to classify a local 2D CT image as crown or root; obtaining position and coverage information of each erupted tooth based on the first 3D digital model; and, for each erupted tooth, using the position and coverage information and a local image segmentation model to segment local images of the erupted tooth starting from the corresponding selected 2D CT image from which the segmentation of the erupted tooth starts, towards the crown and the root of the erupted tooth, to obtain a binary mask image sequence of the erupted tooth.

In some embodiments, the first 3D digital model may be obtained by one of the following means: intraoral scan or scanning an impression or a physical model of the teeth.

In some embodiments, the 2D CT image of the first jaw may be obtained by a Cone Beam Computed Tomography.

In some embodiments, the computer-implemented method of segmenting computed tomography images of teeth may further comprise: for each erupted tooth, using the position and coverage information and the local image segmentation model to segment a local image of the erupted tooth in the selected 2D CT image of the erupted tooth from which the segmentation of the erupted tooth starts, to obtain a binary mask image of the erupted tooth corresponding to the selected 2D CT image; and for each erupted tooth, segmenting a local image of the erupted tooth in a next 2D CT image using the local image segmentation model based on a piece of coverage information which is a binary mask image of the erupted tooth corresponding to a previous 2D CT image.

In some embodiments, the computer-implemented method of segmenting computed tomography images of teeth may further comprise: extracting a mask image sequence of crown parts of the erupted teeth of the first jaw using a global image segmentation model and the local image classification model based on the 2D CT image sequence of the first jaw, wherein the global image segmentation model is a trained deep neural network and is to segment a 2D CT image to extract a global teeth mask image; and registering the first 3D digital model with the mask image sequence of the crown parts of the erupted teeth of the first jaw, to obtain the position and coverage information.

In some embodiments, the registering may comprise projecting the first 3D digital model and the mask image sequence of the crown parts of the erupted teeth of the first jaw on a first plane, and registering the projections of the first 3D digital model and the mask image sequence of the crown parts.

In some embodiments, the first plane may be parallel to the 2D CT image sequence of the first jaw.

In some embodiments, the registering may further comprise projecting the first 3D digital model and the mask image sequence of the crown parts of the erupted teeth of the first jaw on a sagittal plane, and registering the projections of the first 3D digital model and the mask image sequence of the crown parts, wherein the registration result is used for guiding the segmentation of local images of each erupted tooth.

In some embodiments, the registering may be registering the first 3D digital model with the mask image sequence of the crown parts of the erupted teeth of the first jaw in 3D space, to obtain the position and coverage information, to guide the segmentation of local images of each erupted tooth.

In some embodiments, for each erupted tooth, the local image of the erupted tooth in the 2D CT image, from which the segmentation of the erupted tooth starts, may be located in a middle section of the tooth.

In some embodiments, for each erupted tooth, the local image of the erupted tooth in the 2D CT image, from which the segmentation of the erupted tooth starts, may be located at the neck of the tooth.

In some embodiments, the computer-implemented method of segmenting computed tomography images of teeth may further comprise: extracting a global teeth mask image sequence of the first jaw using a global image segmentation model based on the 2D CT image sequence of the first jaw, wherein the global image segmentation model is a trained deep neural network and is to segment a 2D CT image to extract a global teeth mask image; using the local image classification model to delete masks of root parts of all erupted teeth in the global teeth mask image sequence of the first jaw to obtain a second mask image sequence; generating a mask brightness curve based on the second mask image sequence, and determining, based on the brightness curve, ranges where impacted teeth in the 2D CT image sequence of the first jaw are located; for each impacted tooth, determining a 2D CT image, from which segmentation of the impacted tooth starts, within the range where the impacted teeth is located; and for each impacted tooth, using the local image segmentation model to perform final segmentation on local images of the impacted tooth starting from the 2D CT image, from which the segmentation of the impacted tooth starts, towards the crown and root of the impacted tooth, to obtain a binary mask image sequence of the impacted tooth.

In some embodiments, the computer-implemented method of segmenting computed tomography images of teeth may further comprise: for each impacted tooth, using the local image segmentation model to perform pre-segmentation on the local images of the impacted tooth within the range of the 2D CT image sequence, and determining the 2D CT image, from which the segmentation of the impacted tooth starts, based on areas of masks obtained in the pre-segmentation.

In some embodiments, for each impacted tooth, the 2D CT image corresponding to a mask with a maximum area obtained in the pre-segmentation is taken as the 2D CT image from which the segmentation of the impacted tooth starts.

In some embodiments, the computer-implemented method of segmenting computed tomography images of teeth may further comprise: if the distance between the center points of the masks with the maximum area of two impacted teeth is smaller than a first threshold, not performing final segmentation on the impacted tooth corresponding to the mask with a smaller area using the local image segmentation model.

In some embodiments, the computer-implemented method of segmenting computed tomography images of teeth may further comprise: if the distance between the center point of the mask with the maximum area of an impacted tooth and the center point of the mask of the nearest erupted tooth in the 2D CT image from which the segmentation start is greater than a second distance threshold, not performing final segmentation on the impacted tooth using the local image segmentation model.

BRIEF DESCRIPTION OF THE DRAWINGS

The above and other features of the present application will be further illustrated below with reference to figures and their detailed description. It should be appreciated that these figures only show several exemplary embodiments according to the present application, so they should not be construed as limiting the scope of the present application. Unless otherwise specified, the figures are not necessarily drawn to scale, and similar reference numbers therein denote similar components.

FIG. 1 illustrates a schematic flow chart of a method of segmenting computed tomography images of teeth according to one embodiment of the present application;

DETAILED DESCRIPTION OF ILLUSTRATED EMBODIMENTS

Figure 2C:
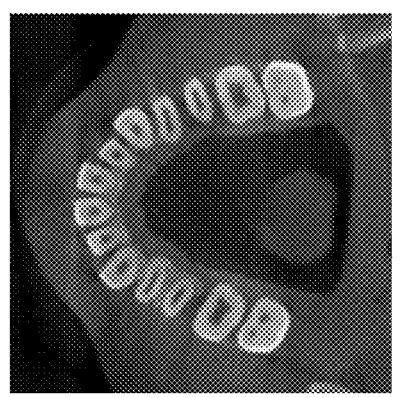
FIG. 2C schematically illustrates a 2D CT image classified as teeth according to one example of the present application.

In the following detailed description, reference is made to the accompanying drawings, which form a part thereof. Exemplary embodiments in the detailed description and figures are only intended for illustration purpose and not meant to be limiting. Inspired by the present application, those skilled in the art understand that other embodiments may be utilized and other changes may be made, without departing from the spirit or scope of the present application. It will be readily understood that aspects of the present application described and illustrated herein can be arranged, replaced, combined, separated and designed in a wide variety of different configurations, all of which are explicitly contemplated and make part of the present application.

An aspect of the present application provides a method of segmenting computed tomography images of teeth, for extracting tooth parts in a 2D CT image sequence.

In one embodiment, a Cone Beam Computed Tomography (hereinafter referred to as CBCT) may be used to obtain a 2D CT image sequence of teeth. It is understood that other CT technologies may also be used to obtain the 2D CT image sequence of the teeth. The 2D CT images of the teeth are grayscale images.

Referring to FIG. 1, it illustrates a schematic flow chart of a method 100 of segmenting computed tomography images of teeth according to one embodiment of the present application.

For ease of illustration, a single jaw (i.e., an upper jaw or a lower jaw) is taken as an example to illustrate the method 100 of segmenting computed tomography images of teeth.

In 101, a first 3D digital model representing crowns of a first jaw and a 2D CT image sequence of the first jaw are obtained.

In one embodiment, the first 3D digital model may be obtained by intraoral scan or by scanning an impression or a physical model of teeth (e.g., a plaster model of teeth), wherein the first 3D digital model may be segmented, i.e., each of the crowns is independent. The technology of obtaining the first 3D digital model is well known in the industry and will not be described in detail here.

Usually, what is obtained using CT is a 2D CT image sequence of an upper and a lower jaws as a whole. To obtain a 2D CT image sequence of the upper jaw or lower jaw, a global image classification model may be used to divide the 2D CT image sequence of the upper and lower jaws as a whole into an upper jaw part and a lower jaw part. The global image classification model is based on a deep convolutional neural network, which may be a Vgg network, an Inception network or a Resnet network etc. In one embodiment, the global image classification model can classify 2D CT images of the 2D CT image sequence into five classes: lower jawbone, teeth, occluded teeth, teeth on open jaws, and upper jawbone, i.e., each 2D CT image is assigned one class. A 2D CT image that only includes lower jawbone or upper jawbone may be classified as lower jawbone or upper jawbone; a 2D CT image that includes jawbone and teeth will be classified as teeth; a 2D CT image that includes upper jaw teeth and lower jaw teeth will be classified as occluded teeth; a 2D CT image that only includes a molar on a single jaw (e.g., the upper jaw or lower jaw) will be classified as open jaw teeth (a 2D CT image sequence obtained by scanning a patient in an open-jaw state usually includes such type of 2D CT image).

Figure 2B:
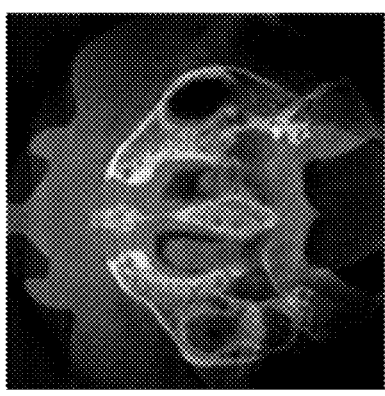
FIG. 2B schematically illustrates a 2D CT image classified as upper jawbone according to one example of the present application.
Figure 2A:
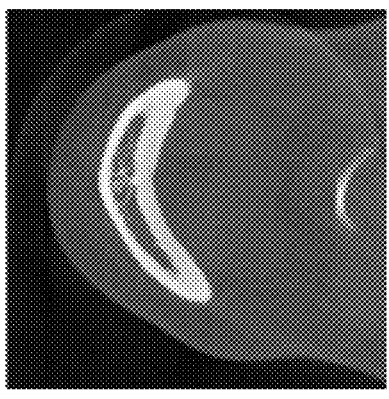
FIG. 2A schematically illustrates a 2D CT image classified as lower jawbone according to one example of the present application.

Referring to FIG. 2A, it schematically illustrates a 2D CT image classified as lower jawbone according to one example of the present application, Referring to FIG. 2B, it schematically illustrates a 2D CT image classified as upper jawbone according to one example of the present application.

Referring to FIG. 2C, it schematically illustrates a 2D CT image classified as teeth according to one example of the present application.

Figure 2E:
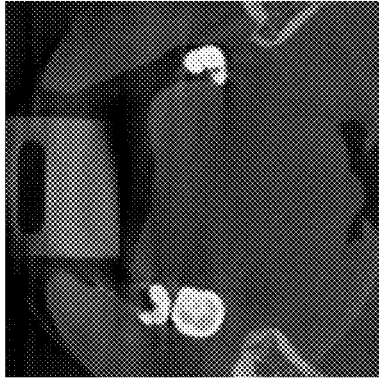
FIG. 2E schematically illustrates a 2D CT image classified as open jaw teeth according to one example of the present application.
Figure 2D:
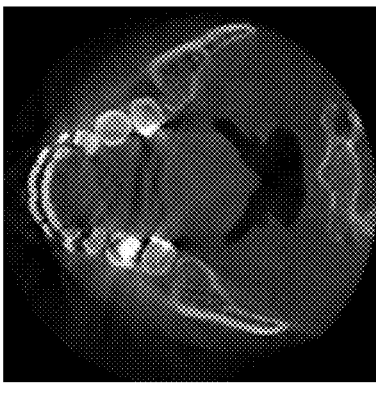
FIG. 2D schematically illustrates a 2D CT image classified as occluded teeth according to one example of the present application.

Referring to FIG. 2D, it schematically illustrates a 2D CT image classified as occluded teeth according to one example of the present application.

Referring to FIG. 2E, it schematically illustrates a 2D CT image classified as open jaw teeth according to one example of the present application.

In 103, masks of crown parts are extracted based on the 2D CT image sequence of the first jaw.

In on embodiment, the global image segmentation model may be used to extract masks of tooth parts based on the 2D CT image sequence of the first jaw, to obtain a global teeth mask image sequence of the first jaw. Each global teeth mask image comprises masks of all teeth in a corresponding 2D CT image, and these tooth masks are regarded as a whole, i.e., they are not segmented from each other, wherein a mask image is a binary image. The global tooth segmentation model may be a trained deep convolutional neural network such as a FCN network, a UNet network or a VNet network etc. In one embodiment, in segmentation of each 2D CT image, the global tooth segmentation model classifies each pixel of the 2D CT image to extract pixels belonging to a tooth.

Figure 3:
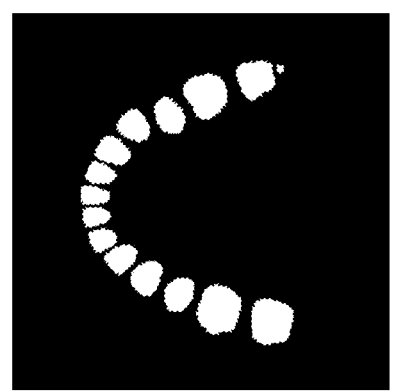
FIG. 3 schematically illustrates a global tooth mask extracted using a global image segmentation model according to one example of the present application.

Referring to FIG. 3, it schematically illustrates a global teeth mask extracted using a global image segmentation model according to one example of the present application.

Then, a local tooth classification model may be used to classify a tooth local image corresponding to a connected area of each tooth mask in the binary image sequence of tooth masks of the first jaw, remove root masks and keep crown masks, to obtain a crown mask image sequence of the first jaw. The local tooth classification model may be a trained deep convolutional neural network such as a Vgg network, an Inception network, a Resnet network or the like. In one embodiment, the local tooth classification model may classify a tooth local image corresponding to a connected area of each tooth mask as one of the following three classes: crown, root and background.

Since a mask of a root part usually does not joint with a neighboring tooth, the masks of the root part of each tooth may be deleted from the global tooth mask image sequence of the first jaw according to the result of the local classification.

In 105, the first 3D digital model and the crown mask image sequence of the first jaw are projected on a first plane and registered.

In one embodiment, the first plane may be parallel to the 2D CT image of the first jaw. In another embodiment, the first plane may be parallel to an xy plane of a coordinate system of the first 3D digital model.

Hereunder, a 2D projection image of the first 3D digital model on the first plane is written as $T_1$, and a 2D projection image of the crown mask image sequence of the first jaw on the first plane is written as $I_1$.

In one embodiment, $T_1$ and $I_1$ may be registered by translation along the first plane and rotation about a first axis perpendicular to the first plane by the following method.

First, $T_1$ is rotated by R degrees to obtain $TR_1$; template matching is performed by taking $TR_1$ as a template image and taking $I_1$ as a source image. A matching coefficient matrix is calculated by a normalized square difference method. A pixel position with a minimum value in the matching coefficient matrix is the optimal matching center point. Some discrete values may be selected from a preset range as R, for example, 11 rotation angles may be selected from a range of −10 degrees to 10 degrees, with a step of 2 degrees.

Then, a matching coefficient value (i.e., a minimum value corresponding to the coefficient matrix) is calculated for each of a series of matching coefficient matrices obtained, a minimum matching coefficient value is identified from the calculated matching coefficient values, and the rotation angle corresponding to the matching coefficient matrix corresponding to the minimum matching coefficient value is an optimal matching rotation angle written as $R_{tml}$. A deviation of the template image is coordinate values min_loc_x1 and min_loc_y1 corresponding to the minimum matching coefficient value. $R_{tml}$, min_loc_x1 and min_loc_y1 are optimal matching transformation parameters, and now the registration on the first plane is accomplished.

In one embodiment, in addition to the registration on the first plane, the first 3D digital model and the crown mask image sequence of the first jaw may also be projected on a sagittal plane, and the projections thereon may be registered to align the first 3D digital model with the crown mask image sequence of the first jaw along a z-axis (i.e., height direction of the teeth). The registration result on the sagittal plane can be used to guide subsequent classification of tooth local mask images (i.e., crown, neck and root) by the local tooth classification model. The registration on the sagittal plane may be performed before or after the registration on the first plane.

In another embodiment, a second 3D digital model may be generated based on the crown mask image sequence of the first jaw, and then the first 3D digital model may be registered with the second 3D digital model in 3D space. The registration result comprises the alignment on the first plane as well as the alignment along the z-axis.

In a further embodiment, a second crown mask image sequence may be generated based on the first 3D digital model, and the second crown mask image sequence may be registered with the crown mask image sequence of the first jaw in 3D space. Similarly, the registration result comprises the alignment on the first plane as well as the alignment along the z-axis.

Inspired by the present application, it is understood that besides the above registration methods, any other suitable registration method may be used and will not be described in detail here.

In 107, position and coverage information of erupted teeth is determined based on the registration result and the first 3D digital model.

In one embodiment, a center point of each crown in the first 3D digital model may be calculated (e.g., the center point of each crown may be obtained by calculating average coordinates of vertices of the crown), and then these center points are projected on the first plane to obtain a projection image $C_1$.

$C_1$ is rotated by $R_{tml}$ according to the transformation parameters obtained from the registration, is translated along the x-axis by min_loc_x1, and is translated along the y-axis by min_loc_y1 to obtain a transformed image $C_{t1}$, and the transformed image $C_{t1}$ is taken as the position information of the erupted teeth of the first jaw.

The projection of each crown in the first 3D digital model on the first plane is rotated by $R_{tml}$ according to the transformation parameters obtained from the registration, is translated along the x-axis by min_loc_x1, and is translated along the y-axis by min_loc_y1 to obtain a transformed image, and the transformed image is taken as the coverage information of the erupted teeth of the first jaw.

In 109, the 2D CT image sequence of the first jaw is re-segmented using the local tooth classification model and local tooth segmentation model based on the position and coverage information of the teeth, to obtain mask sequences of the erupted teeth.

In one embodiment, a tooth local image is cropped from a 2D CT image of the first jaw with a preset range (e.g., a square with a 15 mm-long side, it is understood that the preset range may be adjusted according to physical size of pixel) with the center point of the erupted tooth as the center of the cropped tooth local image. Then, the position of a CT image in which the root of an erupted tooth is adjoined with the crown of the erupted tooth, namely, the CT image in which the neck of the erupted tooth lies may be identified by using the local tooth classification model to classify these tooth local images into crown, root or background.

In one embodiment, for each erupted tooth, segmentation may be performed starting from the CT image where the neck is located, towards the crown and the root, respectively, to extract masks of the erupted tooth, and then, a next CT image may be segmented with reference to the current mask of the erupted tooth. Inspired by the present application, it is understood that segmentation may also be performed starting from a CT image nearby the CT image where the tooth neck is located (i.e., a CT image in the middle section of the tooth), towards the crown and the root, respectively (since the tooth mask of the same tooth in adjacent CT images does not vary a lot in shape, the accuracy of segmentation will not be decreased). For each erupted tooth, a CT image is selected as a starting point of the segmentation, and the selected CT image is referred to hereinafter as the CT image of the erupted tooth from which the segmentation of the erupted tooth starts.

In one embodiment, for each erupted tooth, the local CT image of the erupted tooth in the starting CT image may be segmented using the local tooth segmentation model based on the position and coverage information (i.e., the result obtained after the projection of the crown of the erupted tooth in the first 3D digital model on the first plane is transformed with the transformation parameters), to extract the mask of the erupted tooth in the current CT image (namely, the starting CT image). The local tooth segmentation model may be a trained deep convolutional neural network such as a FCN network, a UNet network or a VNet network etc., and is to extract a tooth mask in a tooth local CT image. In segmentation of a local CT image, the local tooth segmentation model classifies each pixel of the local CT image, to extract pixels belonging to the tooth.

In one embodiment, for the segmentation of a next CT image of the same erupted tooth, the local tooth segmentation model may be used to segment the next local CT image (obtained by the tooth local image classification model) of the erupted tooth in the next CT image based on the tooth mask of the erupted tooth in the current CT image, to extract the mask of the erupted tooth in the next CT image, and so on so forth until the masks of the erupted tooth in all the CT images are extracted.

Briefly, the precise segmentation of the CT image sequence of the first jaw comprises two steps: first, using the local tooth classification model to classify the local CT images based on the position information to find the CT image where the tooth neck of the erupted tooth is located; second, using the local tooth segmentation model to segment the local CT image based on the position and coverage information. Since the position and coverage information is taken reference to, the accuracy and efficiency of the local tooth classification model and the local tooth segmentation model are improved effectively.

In some cases, in addition to the erupted teeth, the first jaw might comprise impacted teeth. Under this situation, these impacted teeth need to be segmented. In the segmentation of the local CT images, the mask sequence of the erupted tooth may be obtained from the segmentation, and meanwhile the mask sequence of the impacted teeth may also be obtained, but the accuracy of the segmentation result of the impacted teeth might not be high. Therefore, the following operations may be performed to obtain an accurate segmentation result of the impacted teeth.

In 111, the impacted teeth are detected using a tooth mask brightness curve.

In one embodiment, a horizontal coordinate of the brightness curve may denote the positions of the CT images along the CT image sequence, and a longitudinal coordinate may denote a sum of brightness of the tooth masks in each CT image, namely, a sum of the number of pixels of the tooth masks or a sum of pixel values.

Usually, in the z-axis direction, an impacted tooth of a lower jaw is located below the neck of an erupted tooth of the lower jaw, and an impacted tooth of an upper jaw is located above the neck of an erupted tooth of the upper jaw. The global teeth mask sequence previously obtained from the segmentation is referred to as a first mask sequence. Since the local segmentation result of the erupted teeth with a high accuracy is already obtained previously, the masks of the roots of all erupted teeth may be removed in the first mask sequence, and only the masks of the crowns of the erupted teeth are kept to obtain a second mask sequence. The tooth mask brightness curve generated based on the second mask sequence will comprise one major peak and one small peak, the major peak corresponds to a CT image index range where the crowns of the erupted teeth are located, and the small peak corresponds to a CT image index range where impacted teeth are located. Then, the impacted teeth may be detected within the CT image index range corresponding to the small peak. Since the masks of the roots of the erupted teeth are already deleted from the second tooth mask sequence, there are only masks of the impacted teeth within the identified range of the second tooth mask sequence.

Then, for each impacted tooth, the local teeth segmentation model may be used to pre-segment the local CT images of the impacted teeth to obtain their mask sequences, a mask with a maximum area may be found from a mask sequence of an impacted tooth, and a center point of the mask may be taken as a seed point for subsequent local segmentation.

At this time, the obtained seed points might include pseudo seed points. In one embodiment, these pseudo seed points may be screened out based on a distance criterion by the following method.

In one embodiment, a first distance threshold may be set to 3 mm. If a distance (a 3D space distance) between the seed points of two impacted teeth is smaller than the first distance threshold, the two seed points probably belong to the same impacted tooth, so a seed point with a smaller mask area is removed.

In one embodiment, a second distance threshold may be set to 15 mm. If a distance between a seed point of an impacted tooth and a seed point of the nearest erupted tooth is greater than the second distance threshold, the seed point probably belongs to the jawbone, so the seed point of the impacted tooth is removed.

Finally, for each remaining seed point, the local tooth segmentation model is used to perform local segmentation starting from a layer where the seed point is located, towards the crown and the root, respectively, to obtain an entire mask sequence of the impacted teeth.

After mask sequences of all teeth (including the erupted teeth and the impacted teeth) are obtained, it may be optimized by a method such as neighboring layer constraint, Gaussian smoothing, and watershed segmentation.

A tooth mask neighboring layer constraint algorithm may remove an over-segmented region in the tooth segmentation result, which includes the following specific operations:

Given that the CT image index where the seed point is located is S, the tooth local image Is of the CT image S is segmented to obtain the mask image Ms of the tooth of the CT image S;

Template matching is performed by taking the Is as the template image, and CT image S+1 as the source image, to obtain the center point of the tooth in the CT image S+1;

The tooth local image $I_{S+1}$ of the CT image S+1 is segmented to obtain a mask image $M_{S+1}$ of the tooth of the CT image S+1;

Displacement transformation is performed on Ms to make a center point of Ms coincide with a center point of $M_{S+1}$;

Morphological dilation operation is performed on Ms to obtain a dilated mask image $M_{SD}$, and 3 may be used as a size of a structuring element;

AND operation is performed with $M_{SD}$ and $M_{S+1}$ to obtain a mask result image $M_{RS+1}$ after the constraint of the crown mask of an adjacent layer;

$M_{RS+1}$ is taken as the mask image of CT image S+1, repeat the above operations on CT image S+2 to calculate the mask image of CT image S+2, and so on so forth until all masks of the tooth are processed.

In one embodiment, Gaussian smoothing may be used to smooth the tooth mask image sequences already processed by the neighboring layer constraint algorithm.

The watershed segmentation algorithm may be used to detect a boundary of connected crowns, and connected neighboring tooth regions are removed from the segmentation result. Specific operations are as follows:

A local image of a crown of the $i^{th}$ layer CT image is segmented using the local tooth segmentation model to obtain a crown mask image $M_{io}$;

It is determined whether the crown is adjoined with a neighboring tooth; if the connected area of the crown in $M_{io}$ contains boundary of the local image, it is determined that the crown is connected with the neighboring tooth, i.e., the crown mask image $M_{io}$ contains a neighboring tooth region;

A marker image is generated from the tooth mask images $M_{i-1}$ and $M_{io}$ of the i-1$^{th}$ layer according to the following Equation (1):

$$\text{Marker}=\text{Erode}(((M_{io}-\text{Dilate}(M_{i-1}))|M_{io}) \qquad \text{Equation (1)}$$

where Erode and Dilate are morphological erosion operation and dilation operation, respectively, and "|" is an OR operation, The Marker is taken as the marker image, the watershed segmentation method is applied to the local image of the crown local CT image of the $i^{th}$ layer to obtain a tooth boundary image B;

A separate crown mask image is obtained by subtracting the boundary image B from $M_{io}$, and a connected area including the center point of the image is extracted from the crown mask image to obtain a crown mask image $M_i$ of the CT image i, wherein $M_i$ is the crown mask without a neighboring tooth region.

After mask sequences of all teeth of the first jaw are obtained, a whole (comprising the crown and root) 3D digital model of these teeth may be generated based on the mask sequence. As for some dental diagnosis and treatment programs, the whole 3D digital model of the teeth is very useful because not only relationships between crowns may be obtained, but also relationships between roots can be obtained.

While various aspects and embodiments have been disclosed herein, other aspects and embodiments will be apparent to those skilled in the art, inspired by the present application. The various aspects and embodiments disclosed herein are for illustration only and are not intended to be limiting, and the scope and spirit of the present application shall be defined by the following claims.

Likewise, the various diagrams may depict exemplary architectures or other configurations of the disclosed methods and systems, which are helpful for understanding the features and functions that can be included in the disclosed methods and systems. The claimed invention is not restricted to the illustrated exemplary architectures or configurations, and desired features can be achieved using a variety of alternative architectures and configurations. Additionally, with regard to flow diagrams, functional descriptions and method claims, the order in which the blocks are presented herein shall not mandate that various embodiments of the functions shall be implemented in the same order unless otherwise the context specifies.

Unless otherwise specifically specified, terms and phrases used herein are generally intended as "open" terms instead of limiting. In some embodiments, use of phrases such as "one or more", "at least" and "but not limited to" should not be construed to imply that the parts of the present application that do not use similar phrases intend to be limiting.

We claim:

1. A computer-implemented method of segmenting computed tomography images of teeth, comprising:

obtaining a first 3D digital model representing crowns of erupted teeth of a first jaw and a 2D CT image sequence of the first jaw;

using a local image classification model to select, for each erupted tooth, a 2D CT image, from which segmentation of the erupted tooth starts, from the 2D CT image sequence of the first jaw, wherein the local image classification model is a trained deep neural network and is to classify a local 2D CT image as one of the following classes: crown and root;

obtaining position and coverage information of each erupted tooth based on the first 3D digital model; and for each erupted tooth, by using the position and coverage information and a local image segmentation model, segmenting a local image of the erupted tooth starting from the corresponding selected 2D CT image from which the segmentation of the erupted tooth starts, towards the crown and the root of the erupted tooth, to obtain a binary mask image sequence of the erupted tooth.

2. The computer-implemented method of claim 1, wherein the first 3D digital model is obtained by one of the following means: intraoral scan or scanning an impression or a physical model of the teeth.

3. The computer-implemented method of claim 1, wherein the 2D CT image sequence of the first jaw is obtained by a Cone Beam Computed Tomography.

4. The computer-implemented method of claim 1 further comprising:

for each erupted tooth, by using the position and coverage information and the local image segmentation model, segmenting the local image of the erupted tooth in the 2D CT image from which the segmentation of the erupted tooth starts, to obtain a binary mask image of the erupted tooth corresponding to the 2D CT image from which the segmentation of the erupted tooth starts; and for each erupted tooth, segmenting the local image of the erupted tooth in a next 2D CT image by the local image segmentation model using the binary mask image of the erupted tooth corresponding to a previous 2D CT image as the current scope information.

5. The computer-implemented method of claim 1, wherein the computer-implemented method further comprises:

extracting a mask image sequence of crown parts of the erupted teeth of the first jaw by using a global image segmentation model and the local image classification model based on the 2D CT image sequence of the first jaw, wherein the global image segmentation model is a trained deep neural network and is to segment a 2D CT image to extract a global tooth mask image; and registering the first 3D digital model with the mask image sequence of the crown parts of the erupted teeth of the first jaw, to obtain the position and coverage information.

6. The computer-implemented method of claim 5, wherein the registering comprises: projecting the first 3D digital model and the mask image sequence of the crown parts of the erupted teeth of the first jaw on a first plane, and registering the projections of the first 3D digital model and the mask image sequence of the crown parts.

7. The computer-implemented method of claim 6, wherein the first plane is parallel to the 2D CT image sequence of the first jaw.

8. The computer-implemented method of claim 7, wherein the registering further comprises: projecting the first 3D digital model and the mask image sequence of the crown parts of the erupted teeth of the first jaw on a sagittal plane, and registering the projections of the first 3D digital model and the mask image sequence of the crown parts, wherein the registration result is used to guide the segmentation of the local images of each erupted tooth.

9. The computer-implemented method of claim 5, wherein the registering is registering the first 3D digital model with the mask image sequence of the crown parts of the erupted teeth of the first jaw in a 3D space, to obtain the position and coverage information, to guide the segmentation of the local images of each erupted tooth.

10. The computer-implemented method of claim 1, wherein for each erupted tooth, the local image of the erupted tooth in the 2D CT image, from which the segmentation of the erupted tooth starts, is located in a middle section of the tooth.

11. The computer-implemented method of claim 10, wherein for each erupted tooth, the local image of the erupted tooth in the 2D CT image from which the segmentation of the erupted tooth starts, is located at the neck of the tooth.

12. A computer-implemented method of segmenting computed tomography images of teeth, comprising:

obtaining a first 3D digital model representing crowns of erupted teeth of a first jaw and a 2D CT image sequence of the first jaw;

using a local image classification model to select, for each erupted tooth, a 2D CT image, from which segmentation of the erupted tooth starts, from the 2D CT image sequence of the first jaw, wherein the local image classification model is a trained deep neural network and is to classify a local 2D CT image as one of the following classes: crown and root;

obtaining position and coverage information of each erupted tooth based on the first 3D digital model;

for each erupted tooth, by using the position and coverage information and a local image segmentation model, segmenting a local image of the erupted tooth starting from the corresponding selected 2D CT image from which the segmentation of the erupted tooth starts, towards the crown and the root of the erupted tooth, to obtain a binary mask image sequence of the erupted tooth;

extracting a global tooth mask image sequence of the first jaw using a global image segmentation model based on the 2D CT image sequence of the first jaw, wherein the global image segmentation model is a trained deep neural network and is to segment a 2D CT image to extract a global tooth mask image;

using the local image classification model to delete masks of root parts of all erupted teeth in the global tooth mask image sequence of the first jaw to obtain a second mask image sequence;

generating a mask brightness curve based on the second mask image sequence, and determining, based on the brightness curve, a range where impacted teeth in the 2D CT image sequence of the first jaw are located;

for each impacted tooth, determining a 2D CT image from which segmentation of the impacted tooth starts, within the range where the impacted tooth is located; and for each impacted tooth, using the local image segmentation model to segment local images of the impacted tooth starting from the 2D CT image, from which the segmentation of the impacted tooth starts, towards the crown and root of the impacted tooth, to obtain a binary mask image sequence of the impacted tooth.

13. The computer-implemented method of claim 12, further comprising: for each impacted tooth, using the local image segmentation model to perform pre-segmentation on the local images of the impacted tooth within the range of the 2D CT image sequence, and determining the 2D CT image, from which the segmentation of the impacted tooth starts, based on areas of the masks obtained from the pre-segmentation.

14. The computer-implemented method of claim 13, wherein for each impacted tooth, the 2D CT image corresponding to a mask with a maximum area obtained from the pre-segmentation is taken as the 2D CT image from which the segmentation of the impacted tooth starts.

15. The computer-implemented method of claim 14, further comprising: if a distance between center points of the masks with the maximum areas of two impacted teeth is smaller than a first threshold, not performing final segmentation on the impacted tooth corresponding to the mask with a smaller area using the local image segmentation model.

16. The computer-implemented method of claim 14, further comprising: if a distance between the center point of the mask with the maximum area of an impacted tooth and the center point of the mask of the nearest erupted tooth in the 2D CT image from which the segmentation of the erupted tooth starts is greater than a second distance threshold, not performing final segmentation on the impacted tooth using the local image segmentation model.

\* \* \* \* \*